(12) United States Patent
Beckmann et al.

(10) Patent No.: US 10,174,980 B2
(45) Date of Patent: Jan. 8, 2019

(54) METHOD FOR BRAKING A COMPRESSOR, COMPRESSOR OF A REFRIGERATION APPLIANCE, AN AIR CONDITIONING APPLIANCE OR A HEAT PUMP, AND REFRIGERATION APPLIANCE, AIR CONDITIONING APPLIANCE OR HEAT PUMP HAVING THE COMPRESSOR

(71) Applicant: BSH HAUSGERAETE GMBH, Munich (DE)

(72) Inventors: Tommy Beckmann, Durchhausen (DE); Achim Paulduro, Albeck (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/506,790

(22) PCT Filed: Aug. 19, 2015

(86) PCT No.: PCT/EP2015/069041
§ 371 (c)(1),
(2) Date: Feb. 27, 2017

(87) PCT Pub. No.: WO2016/030250
PCT Pub. Date: Mar. 3, 2016

(65) Prior Publication Data
US 2017/0254575 A1    Sep. 7, 2017

(30) Foreign Application Priority Data
Aug. 26, 2014    (DE) .................. 10 2014 217 005

(51) Int. Cl.
*F25B 40/02* (2006.01)
*F25D 11/00* (2006.01)
(Continued)

(52) U.S. Cl.
CPC ............ *F25B 49/025* (2013.01); *F25D 11/00* (2013.01); *H02P 3/08* (2013.01); *H02P 6/14* (2013.01)

(58) Field of Classification Search
CPC .............. F25B 2600/021; F25B 49/025; F25B 2309/061; F25B 2500/26
(Continued)

(56) References Cited

U.S. PATENT DOCUMENTS 5,140,248 A * 8/1992 Rowan .............. H02M 7/53873
318/811
5,723,967 A * 3/1998 Hongo ...................... H02P 6/21
318/400.11
(Continued)

FOREIGN PATENT DOCUMENTS

DE  102010030239 A1  12/2011
JP  2012244869 A     12/2012
JP  2013059194 A      3/2013

*Primary Examiner* — Jorge L Carrasquillo
(74) *Attorney, Agent, or Firm* — Laurence A. Greenberg; Werner H. Stemer; Ralph E. Locher

(57) ABSTRACT

A method is provided for braking a compressor of a refrigeration appliance, of an air conditioning appliance or of a heat pump in which the compressor has a brushless motor with windings and a controller for braking the motor. The controller is configured to brake the brushless motor by using a braking current in a controlled manner starting from an operating rotational speed, in which the braking current during the controlled braking is dependent on induced voltages determined before the controlled braking. The method for braking includes rotating the motor at an operating rotational speed, receiving a signal for decelerating, braking or slowing down, determining voltages induced in the windings and supplying a braking current having a decreasing frequency to the windings, in which the braking current during the braking is dependent on the previously (Continued)

determined induced voltages. A compressor and a refrigeration appliance having the compressor are also provided.

12 Claims, 1 Drawing Sheet

(51) Int. Cl.
*F25B 49/02* (2006.01)
*H02P 3/08* (2006.01)
*H02P 6/14* (2016.01)

(58) Field of Classification Search
USPC .......... 361/22; 318/376, 362, 56, 57, 60, 86, 318/703, 741, 757, 789, 760
See application file for complete search history.

(56) References Cited

U.S. PATENT DOCUMENTS

| | | | | |
|---|---|---|---|---|
| 5,739,650 A * | 4/1998 | Kimura | ............. | H02P 6/08 318/400.07 |
| 5,850,130 A * | 12/1998 | Fujisaki | ............. | C22C 1/02 318/400.12 |
| 6,198,240 B1 * | 3/2001 | Notohara | ............. | B60H 1/00828 318/268 |
| RE37,360 E * | 9/2001 | Duncan | ............. | D06F 37/306 318/281 |
| 6,396,229 B1 * | 5/2002 | Sakamoto | ............. | H02P 6/18 318/400.02 |
| 6,429,612 B1 * | 8/2002 | Kume | ............. | H02P 3/18 318/139 |
| 6,603,280 B2 * | 8/2003 | Notohara | ............. | H02M 5/4585 318/500 |
| 6,822,417 B2 * | 11/2004 | Kawaji | ............. | H02P 25/089 318/432 |
| 6,850,031 B2 * | 2/2005 | Nakata | ............. | H02P 6/06 318/800 |
| 7,455,133 B2 * | 11/2008 | Kaneko | ............. | B60L 11/12 180/242 |
| 7,650,760 B2 * | 1/2010 | Nakata | ............. | H02P 6/06 318/722 |
| 8,070,108 B2 * | 12/2011 | Severson | ............. | A63H 19/24 246/1 C |
| 8,269,436 B2 * | 9/2012 | Hashimoto | ............. | H02P 21/0089 318/400.01 |
| 8,441,224 B2 * | 5/2013 | Sumi | ............. | B60L 3/04 180/65.265 |
| 8,616,016 B2 * | 12/2013 | Asano | ............. | F25B 49/025 62/238.7 |
| 8,704,471 B2 * | 4/2014 | Kameyama | ............. | H02P 6/10 318/400.13 |
| 8,716,964 B2 * | 5/2014 | Tanaka | ............. | H02P 6/18 318/400.01 |
| 8,896,258 B2 | 11/2014 | Abel et al. | | |
| 9,190,940 B2 * | 11/2015 | Markham | ............. | H02P 6/08 |
| 9,479,093 B2 * | 10/2016 | Silitonga | ............. | H02P 6/08 |
| 2001/0035018 A1 * | 11/2001 | Takagi | ............. | F25B 49/025 62/228.4 |
| 2006/0113929 A1 * | 6/2006 | DeLange | ............. | G01J 1/04 318/63 |
| 2008/0072619 A1 * | 3/2008 | Nojima | ............. | F25B 49/025 62/498 |
| 2008/0224641 A1 * | 9/2008 | Hoogzaad | ............. | H02P 6/182 318/400.34 |
| 2012/0060527 A1 * | 3/2012 | Song | ............. | F25B 49/027 62/126 |
| 2015/0219378 A1 * | 8/2015 | Crane | ............. | F25B 49/022 62/115 |
| 2015/0280631 A1 * | 10/2015 | Osamura | ............. | H02P 23/0068 318/461 |
| 2017/0359006 A1 * | 12/2017 | Marcetic | ............. | H02P 3/18 |

* cited by examiner

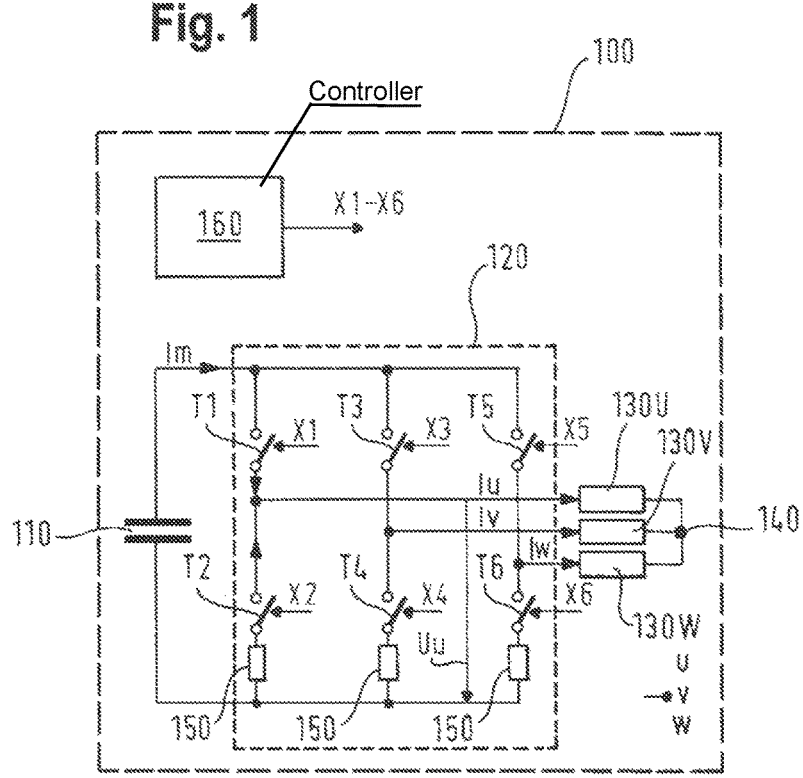
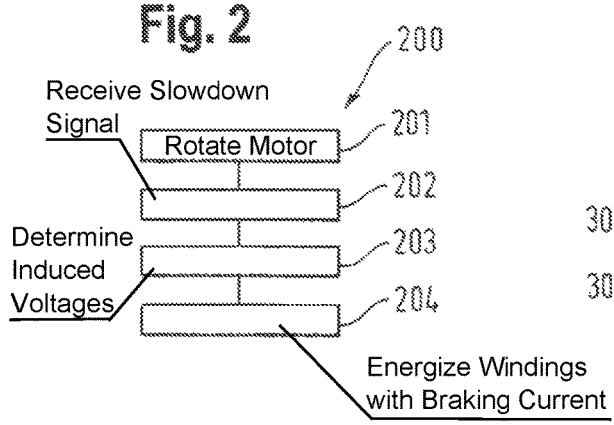
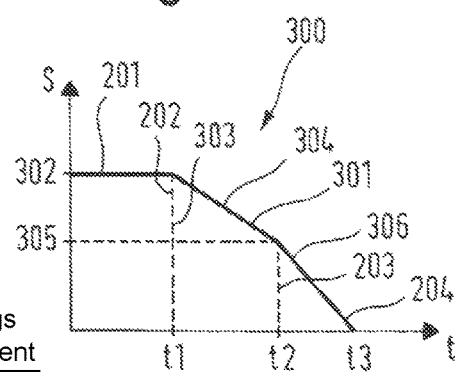

METHOD FOR BRAKING A COMPRESSOR, COMPRESSOR OF A REFRIGERATION APPLIANCE, AN AIR CONDITIONING APPLIANCE OR A HEAT PUMP, AND REFRIGERATION APPLIANCE, AIR CONDITIONING APPLIANCE OR HEAT PUMP HAVING THE COMPRESSOR

BACKGROUND OF THE INVENTION

Field of the Invention

The present invention relates to a method for braking a compressor and a compressor of a refrigeration appliance, in particular of a domestic refrigeration appliance, of an air conditioning appliance or of a heat pump, as well as a refrigeration appliance, air conditioning appliance or heat pump with such. The invention relates in particular to compressors with brushless motors such as permanent magnet synchronous motors or PMSMs and brushless direct current motors or BLDC motors.

PMSMs and BLDC motors are used for example as compressor drives in refrigeration appliances, air conditioning appliances or heat pumps. Such electric motors have windings in a stator and a rotor which comprises a permanent magnet. When current flows through the windings, they generate a magnetic field which applies a torque to the permanent magnet, thereby causing the rotor to move. Activating the various windings in the stator in an alternating manner causes a rotating magnetic field to be generated which therefore drives the rotor.

The rotational speed of PMSMs and BLDC motors is regulated above a rotational speed mark, from which the position of the rotor can be determined reliably by measuring induced voltages in the stator windings. The motor is ramped up to this rotational speed mark with a start-up circuit. When the rotational speed mark is reached, a rotational speed regulator takes over the activation and maintenance of a required rotational speed, determining the rotor position for this purpose.

Compressors in domestic refrigeration appliances have an electrically driven pump in a hermetically sealed housing, the compressor shell. PMSMs and BLDC motors are frequently used in compressors with rotational speed regulation with a large rotational speed range. The load torque here is distributed unevenly over a motor rotation with a narrow peak around the upper dead center position of a compressor piston moving in a cylinder.

Therefore when designing a compressor it is necessary to take into account a tendency to vibrate on the part of the mechanical system and operation of the motor at resonant frequencies should be avoided. During operation the avoidance of resonant frequencies should be achieved systematically on the part of a controller, as the resonant frequency ranges for a model are known. Ramping up is also not problematic, as acceleration beyond resonant ranges is quickly achieved. DE 10 2010 030 239 A1 describes the starting up of a BLDC motor.

When a compressor is turned off, rotational speed regulation generally first brings it toward the rotational speed mark. The situation then arises that on the one hand it is generally not possible to use a braking circuit corresponding to the start-up circuit, as the compressor slows of its own accord once the current has been disconnected. On the other hand the rotational speed regulator cannot be used below the rotational speed mark, as the position of the rotor can no longer be reliably determined by measuring induced voltages due to the back EMF in the stator windings. If the compressor were to freewheel, a resonant frequency could be reached and the compressor drive could hit the compressor shell.

This is avoided according to the prior art in that, during the course of slowing down, the lower switches of an inverter bridge short circuit all the winding strands below the rotational speed mark. The motor is thus slowed down quickly by short circuiting.

The disadvantage of this prior art is that slowing down in this manner with unknown forces, requires a complex and robust pump design while the risk remains that a resonant frequency may be reached and the pump may strike the compressor shell.

SUMMARY OF THE INVENTION

It is the object of the invention to slow down a compressor of a refrigeration appliance, in particular of a domestic refrigeration appliance, of an air conditioning appliance or of a heat pump, in such a manner that a less complex pump design is required and the pump is prevented from striking the compressor shell where possible.

Said object is achieved with the method for braking a compressor and the compressor of a refrigeration appliance, of an air conditioning appliance or of a heat pump as set out in the independent claims. The inventive method for braking a compressor of a refrigeration appliance, of an air conditioning appliance or of a heat pump, wherein the compressor has a PMSM and BLDC motor with windings starts with method step a) rotating the motor at an operating rotational speed as an initial situation in which according to method step b) a signal for slowing down is received. In method step c) voltages induced in the windings are determined and in method step d) the windings are energized with a braking current at a decreasing frequency, the braking current during braking being a function of the previously determined induced voltages.

The inventive compressor has a PMSM and BLDC motor with windings and a controller for braking the motor starting from an operating rotational speed, the controller being designed to slow down the motor with a braking current, the braking current during braking being a function of induced voltages determined before controlled braking.

The invention relates to an appliance with a refrigerant circuit with a compressor, in particular a refrigeration appliance, an air conditioning appliance or a heat pump. For verbal simplification the invention is only described with reference to a refrigeration appliance.

During inventive braking the induced voltages due to counter EMF (or back electromotive force or back-EMF) are first determined and the motor currents representing the instantaneous load are measured. In a refrigeration appliance this would be the instantaneous load of the compressor incorporated in a refrigerant circuit, which is essentially a function of the instantaneous pressures in the evaporator and condenser. The pressure in the evaporator determines the quantity of refrigerant conveyed per motor revolution, which is conveyed or compressed counter to the pressure in the condenser. PMSMs and BLDC motors are generally operated with three rotary current phases offset respectively by 120°. Two measured induced voltages can be used to determine the third.

Braking takes place in that the rotational speed is controlled on a predefined rotational speed curve, the rotor position not being taken into account. It is assumed that the instantaneous load does not change significantly during braking, as the instantaneous load is determined by the only slowly changing operating conditions. According to the invention this is utilized in that the rotational speed is reduced in a controlled manner on a predefined rotational speed curve with an energization which is a function of the instantaneous load determined before controlled braking. The frequency of the determined induced voltages or the rotational speed at the time of determination of the induced voltages can be included as a further variable in the calculation of energization. Taking into account the induced voltages and therefore the instantaneous load when calculating energization ensures that the rotor is reliably carried along by the controlled stator field during braking. This ensures that the actual rotational speed of the rotor is clearly defined at every time point during braking, even in the lower rotational speed range, where the rotor position and therefore the rotational speed cannot be reliably determined by induced voltages, as said voltages are too small.

According to one embodiment of the present invention the signal for slowing down is given in the form of a preselected rotational speed that is smaller than the operating rotational speed, in particular in the form of a preselected rotational speed of zero. Braking of the motor to the rotational speed of zero, in other words stopping the motor, is the usual application. However it is also possible to slow down to low final rotational speeds.

According to a further embodiment of the present invention a load torque is determined to determine the braking current from the determined induced voltages. This allows control based on the physical variable of the load torque.

According to a further embodiment of the present invention, after the signal for slowing down has been received, a rotational speed regulator allows a limit rotational speed to be approached, said rotational speed regulator being switched off when the limit rotational speed has been reached. This rotational speed regulator can be a conventional rotational speed regulator, in particular with a ramp-type rotational speed profile. The motor is preferably operated at an operating rotational speed above the limit rotational speed, the limit rotational speed being a rotational speed above which the motor is regulated to a rotational speed with the aid of a determination of a rotor position by means of measured induced voltages.

These embodiments relate to the preferred instance that a limit rotational speed is first approached starting from an operating rotational speed with the aid of a conventional rotational speed regulator present in the controller. The limit rotational speed is preferably the lowest rotational speed for which rotational speed regulation is permitted. At the limit rotational speed the rotational speed regulator ceases to activate the motor and the inventive braking controller takes over motor activation. It should be noted that the inventive braking controller also functions and can be used at higher rotational speeds than the limit rotational speed.

Energization of the windings advantageously takes place with a braking current at a frequency that decreases in a ramp-type manner. This has the advantage that control is simple to implement.

According to a further embodiment of the present invention the induced voltages are determined after slowing down to the rotational speed of zero. This allows a check to be carried out to ensure that the motor has stopped when no more induced voltages can be determined.

Energization is advantageously stopped after slowing to save energy.

According to a further embodiment of the present invention the windings of the motor are energized with an essentially sinusoidal current. This is the preferred wave shape for each of the windings in the motor, in particular in a PMSM. This allows the application of a space vector modulation for control. The essentially sinusoidal current is preferably generated by means of a pulse width modulation.

An inventive refrigeration appliance is fitted with a compressor as described above. Such a refrigeration appliance can avoid disruptive disconnection noise from the compressor and can be produced with a less complex pump suspension system.

A refrigeration appliance refers in particular to a domestic refrigeration appliance, in other words a refrigeration appliance used for domestic management in a domestic situation or in some instances also in catering, which in particular serves to store food and/or beverages in normal domestic quantities at defined temperatures, for example a refrigerator, a freezer cabinet, a combined refrigerator/freezer, a chest freezer or a wine storage cabinet.

BRIEF DESCRIPTION OF THE SEVERAL VIEWS OF THE DRAWING

Further features and advantages of the invention will emerge from the description which follows of exemplary embodiments with reference to the accompanying figures, in which:

FIG. 1 shows an equivalent circuit diagram of an electric motor, which is configured as a brushless motor, such as a PMSM or a BLDC motor, of an inventive compressor, FIG. 2 shows a flow diagram of an inventive method, and FIG. 3 shows a diagram of a rotational speed curve for braking an inventive compressor.

DESCRIPTION OF THE INVENTION

FIG. 1 shows an equivalent circuit diagram of a brushless motor 100, which can be used for example as a compressor drive in a refrigerator. The brushless motor 100 has a voltage source 110, an inverter 120, three motor windings or windings 130U, 130V, 130W and a controller 160.

The voltage source 110 supplies an intermediate circuit voltage between an intermediate circuit supply potential and an intermediate circuit ground. The inverter 120 has six switches T1 to T6, which are arranged in the form of a B6 bridge and supply the windings 130U, 130V and 130W with current. More precisely two switches T1 and T2, T3 and T4 and T5 and T6 respectively are connected in series between the intermediate circuit supply potential and the intermediate circuit ground. The nodes between the switches T1 and T2, T3 and T4 and T5 and T6 are each connected to one side of the windings 130U, 130V and 130W. On their other side the windings 130U, 130V and 130W are connected to a star point 140. Shunt resistors 150 are also provided between the switches T2, T4 and T6 respectively and the intermediate circuit ground.

The switches T1 to T6 can each comprise for example a power transistor and a freewheeling diode connected parallel thereto. The switches T1 to T6 are activated by means of control signals X1 to X6 supplied by a controller 160. The controller 160 here corresponds to an apparatus for controlling an electric motor. The windings 130 are activated in such a manner that a rotating magnetic field is generated, in which a rotor comprising a permanent magnet rotates. The motor is therefore a permanent magnet synchronous motor with three windings 130U, 130V and 130W, which is supplied with a three-phase voltage by means of the B6 inverter 120, exciting currents lu, lv and lw being generated through the windings 130U, 130V and 130W.

The inventive compressor of a refrigeration appliance has a brushless motor 100 with windings 130U, 130V and 130W and a controller 160 for braking the motor starting from an operating rotational speed, the controller 160 being designed to slow down the brushless motor 100 in a controlled manner with a braking current, the braking current during braking being a function of induced voltages determined before controlled braking.

The further properties of the controller 160 will emerge from the description which follows of the inventive method.

FIG. 2 shows a flow diagram 200 of an inventive method for braking a compressor of a refrigeration appliance, the compressor having a brushless motor with windings, like the brushless motor 100 with windings 130U, 130V and 130W and the controller 160, as known from FIG. 1.

The method starts with method step a), rotating 201 the motor at an operating rotational speed as an initial situation, in which according to method step b) a signal 202 for slowing down is received. In method step c) voltages induced in the windings 203 are determined and in method step d) the windings 204 are energized with a braking current at a decreasing frequency, the braking current during braking being a function of the induced voltages determined before controlled braking.

FIG. 3 shows a diagram 300 of a rotational speed curve 301 for braking an inventive compressor, on which the individual method steps can be completed and in which a number of embodiments are described. The rotational speed S is plotted over time t in diagram 300.

According to the embodiment of the invention illustrated in diagram 300 the method starts with method step a), rotating 201 the motor at a constantly shown operating rotational speed 302 as an initial situation. At time point t1 the controller receives 202 a signal 303 for slowing down according to method step b). In the illustrated exemplary embodiment the signal for slowing down is given in the form of a preselected rotational speed of zero. Until time point t1 a rotational speed regulator regulates the motor. When the signal 303 is received, the inventive controller takes over control of the motor.

Diagram 300 shows an embodiment according to which the rotational speed is still within the range of the rotational speed regulator at the time point of the signal 303 for slowing down. The inventive controller utilizes this, on receipt of the signal 303 for slowing down, first to approach a limit rotational speed 305 with a ramp-type rotational speed profile 304 using conventional rotational speed regulation. The limit rotational speed 305 is the lower limit of the regulating range of the rotational speed regulator. The limit rotational speed 305 is reached at time point t2, whereupon the conventional rotational speed regulator is deactivated.

In method step c) voltages induced in the windings are determined, 203, allowing the controller indirectly to detect the current load at the instantaneous rotational speed, in this instance the limit rotational speed 305.

This information is taken into account to allow controlled braking, with the windings being energized in method step d) with a braking current at a decreasing frequency 204. During such controlled braking the braking current during braking is a function of the induced voltages determined before controlled braking. The motor here is slowed down on a predefined rotational speed curve, in this instance with a ramp-type rotational speed profile 306, until it comes to a stop at time point t3.

It can be checked that the motor has stopped in that no more induced voltages can be determined. Energization is stopped after slowing.

Braking takes place in that the rotational speed is controlled on a predefined rotational speed curve, there being no need to monitor the rotor position constantly.

It should be noted that the segment shown in this embodiment with the regulated approach to the lower limit frequency, illustrated by the rotational speed profile 304, can be omitted. The voltages induced in the windings could also be determined and used for controlled braking immediately on receipt of the signal for slowing down at t1.

It would also be possible to determine the voltages induced in the windings immediately on receipt of the signal for slowing down at t1 and only to use said voltages after t2 for the controlled braking of the motor on a predefined rotational speed curve, as the externally predefined load conditions change at most insignificantly between t1 and t2.

In a compressor of a refrigeration appliance with a brushless motor 100 with windings 130U, 130V, 130W and a controller 160 for braking the motor starting from an operating rotational speed, the controller 160 is designed to slow down the motor in a controlled manner with a braking current, the braking current during controlled braking being a function of induced voltages determined before controlled braking, in other words before the start of the rotational speed profile 306 in diagram 300.

According to a further embodiment of the present invention the windings of the motor are energized with an essentially sinusoidal current, which is generated by means of pulse width modulation. Inductive inertia causes pulse width modulated voltages to be formed in controlled currents, resulting essentially in a sinusoidal current

LIST OF REFERENCE CHARACTERS

100 Motor
110 Voltage source
120 Inverter
130U, 130V, 130W Windings
140 Star point
150 Resistor
160 Controller
200 Flow diagram
201 Rotating the motor at an operating rotational speed
202 Receiving a signal for slowing down
203 Determining voltages induced in the windings
204 Energizing windings with a braking current
300 Diagram
301 Rotational speed curve
302 Operating rotational speed
303 Signal for slowing down
304 Rotational speed profile
305 Limit rotational speed
306 Rotational speed profile
T1 . . . T6 Switches
t1, t1 Time points

The invention claimed is:
1. A method for braking a compressor of a refrigeration appliance, of an air conditioning appliance or of a heat pump, the method comprising the following steps:
rotating a brushless permanent-magnet synchronous motor at an operating rotational speed for driving the compressor, the operating rotational speed being above a limit rotational speed;
receiving a signal for slowing down the brushless motor;

determining voltages induced in windings of the brushless motor;

controlling the rotational speed of the motor, the controlling including:

setting the limit rotational speed as a rotational speed above which the brushless motor is controlled by determining a rotor position using determined induced voltages;

upon receiving the signal for slowing down, approaching the limit rotational speed by using a rotational speed regulation, and deactivating the rotational speed regulation upon reaching the limit rotational speed; and after deactivating the rotational speed regulation upon reaching the limit rotational speed, controlling the rotational speed of the motor along a predefined rotational speed curve by energizing the windings of the brushless motor with a braking current at a decreasing frequency, the braking current during braking being a function of the previously determined induced voltages and of frequencies of the previously determined induced voltages.

2. The method according to claim 1, which further comprises providing the signal for slowing down as a preselected rotational speed being smaller than the operating rotational speed.

3. The method according to claim 2, which further comprises providing the signal for slowing down as a preselected rotational speed of zero.

4. The method according to claim 1, which further comprises determining a load torque for determining the braking current from the determined induced voltages.

5. The method according to claim 1, which further comprises approaching the limit rotational speed by using a conventional or ramp-type rotational speed regulation.

6. The method according to claim 1, which further comprises carrying out the step of energizing the windings of the brushless motor with a braking current at a frequency decreasing in a ramp-type manner.

7. The method according to claim 1, which further comprises measuring induced voltages after slowing down to a rotational speed of zero.

8. The method according to claim 1, which further comprises stopping the energizing step after slowing down.

9. The method according to claim 1, which further comprises carrying out the energizing step with a substantially sinusoidal current.

10. The method according to claim 9, which further comprises generating the substantially sinusoidal current by pulse width modulation.

11. A compressor of a refrigeration appliance, of an air conditioning appliance or of a heat pump, the compressor comprising:

a brushless permanent-magnet synchronous motor having windings; and a controller for braking a rotational speed of said brushless permanent-magnet synchronous motor starting from an operational rotational speed above a limit rotational speed, said controller being configured for:

setting the limit rotational speed as a rotational speed above which the brushless motor is controlled by determining a rotor position using determined induced voltages;

upon receiving a signal for slowing down said brushless motor, using a rotational speed regulation to approach the limit rotational speed, and deactivating the rotational speed regulation upon reaching the limit rotational speed; and after deactivating the rotational speed regulation upon reaching the limit rotational speed, controlling a rotational speed of said brushless motor along a predefined rotational speed curve to slow down said brushless motor in a controlled manner with a braking current, said braking current during controlled braking being a function of induced voltages previously determined before said controlled braking and frequencies of the previously determined induced voltages.

12. A refrigeration appliance, air conditioning appliance or heat pump, comprising a compressor according to claim 11.

* * * * *